United States Patent Office 2,865,079
Patented Dec. 23, 1958

2,865,079

PROCESS FOR SHAPING IN A MOLD A MOLDABLE MATERIAL IN THE FORM OF HOLLOW BODIES OF NON-UNIFORM CROSS SECTION, BY EMPLOYING AN INFLATABLE INNER BAG AND YIELDING ELEMENTS PLACED ON SAID INNER BAG

Giorgio Marchioli and Giuseppe Gremigni, Milan, Italy

Application June 2, 1955, Serial No. 512,808

Claims priority, application Italy April 13, 1955

5 Claims. (Cl. 25—128)

It is known to use inflatable rubber cores, filled with air or water, for pressing yielding materials such as, sheeted asbestos-cement, against a rigid mould; for example, in manufacturing joints for asbestos-cement pipings.

The inner bag has, generally, the form of a tube, bifurcated in the case of "breeches pieces" and fitted with at least one enlarged end to define a coupling for connection with a tube.

The existing inflatable cores had, generally, a uniform thickness and had shown so many defects as to preclude their use in an industrial process. However, recently moulding inside a rigid mould has been adopted, in spite of the greater amount of workmanship required, rather than the shaping operation performed on the outer surface of a rigid core. The main troubles with moulding inside a rigid mould consist in that it is difficult to estimate the deformations of the rubber bag due to the applied pressure, said deformations do not vary in function of the stresses according to a straight forward relationship, the elastic characteristics of the rubber vary in a considerable way due to the ageing of the rubber and to the stresses to which said rubber has been subjected and also with the different compositions of the rubber employed.

It is very difficult, furthermore, to obtain sharp edges by employing such inflatable cores. It has been tried, in the past, to make the thickness of the bag variable, i. e. to use inflatable cores having walls of non-uniform thickness but, due to the fact that the relationship between stresses and deformations is not a straight-forward one, these endeavours tend to annul the advantage aimed at.

Another defect shown by the rubber inflatable cores used for moulding "breeches pieces" is the difficulty of pulling them out from the moulded piece; in order to facilitate this extraction the wall thickness of the core should be as low as practicable, while for the handling of said core during the moulding operation a relatively large wall thickness would be desirable.

The difficulties mentioned above are further aggravated when connecting sockets are to be provided on the moulded piece.

It is an object of the present invention to provide a process overcoming the aforementioned troubles, so as to allow the manufacture of hollow bodies by shaping them within rigid moulds with inflatable rubber cores capable of assuming, under pressure, the required shape.

According to the process of the invention, on an inflatable body having a diameter substantially smaller than the one of the hollow body to be manufactured, at least one annular yielding element, the outside diameter of which is slightly smaller than the inside diameter of said hollow body and the inside diameter of which is substantially greater than the outside diameter of said inflatable body, is placed.

The inflatable body is inflated until its outside diameter is substantially equal to the inside diameter of said annular element; the mouldable material, for example, cement-asbestos in the wet sheet form, is then applied over the assembly of the inflated body and the annular element, the whole is introduced in the mould, the inflatable body is further inflated in order to press the mouldable material against the mould walls, then pressure is released from the inflatable body and the inflatable body and the annular element are extracted from the moulded hollow body.

In the case of hollow bodies consisting of several parts of non-uniform diameter which are not coaxially arranged, the inflatable element also will be formed of similarly related cylindrical sections, each one of which will have a diameter substantially smaller than the minimum inside diameter of every individual portion of the hollow body to be moulded.

The way in which said process is to be performed and the construction of an inflatable core used therefor will be clearer when reference is had to an embodiment illustrated, by way of example only, in the accompanying drawings, wherein.

Figure 1:
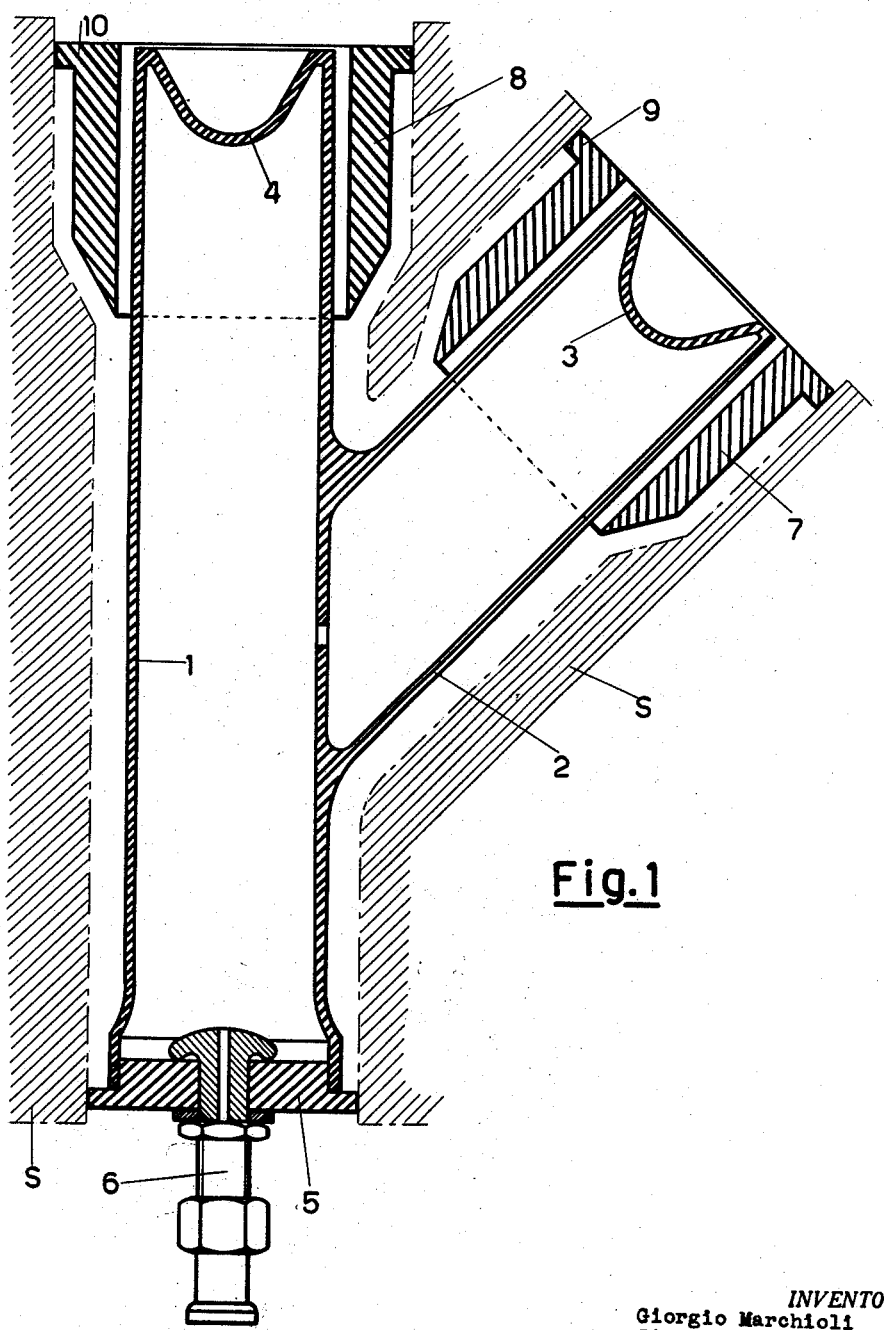
Fig. 1 shows the inflatable body, in inoperative position, adapted to shape a pipe fitting having a "breeches piece" form.
Figure 2:
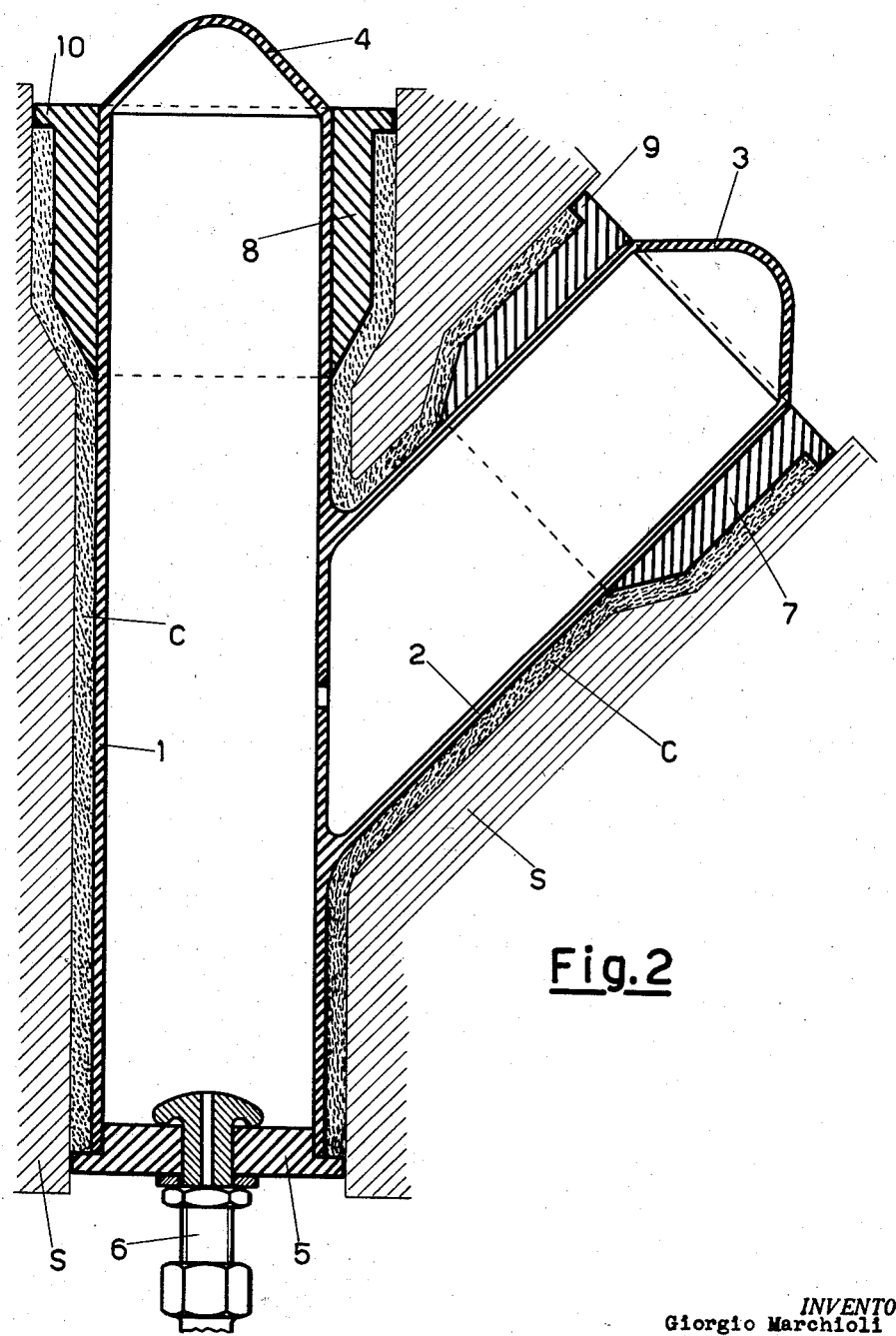
Fig. 2 shows the same inflatatble body in operation in the relevant mould.

In the embodiment shown, the hollow body to be manufactured is a "Y-shaped" or "breeches-piece" fitting, having an end socket adapted to receive the end of a pipe.

The inner bag (inflatable element) practically consists of two rubber hoses 1 and 2, intercommunicating with each other and having a diameter substantially smaller than the inner diameter of the hollow body C to be moulded. The inner bag is closed at each end by end walls 3—4, 5, the last of which is fitted with a valve of the type used for tire inner tubes.

At the two socket-shaped ends of the hollow body C two annular rubber bodies, 7 and 8, are provided, which have outer rims 9 and 10 and have an inside diameter substantially greater than the normal or uninflated outside diameter of the hoses 1—2. S indicates the mould, which is diagrammatically shown.

To perform the moulding of the body C, air under low pressure is introduced, through valve 6, in the hoses 1—2, inflating said hoses until their outside diameter reaches the inside diameter of the annular bodies 7—8 previously placed thereon, thereby to frictionally hold the annular bodies on the related hoses; the mouldable material, for example, asbestos-cement in sheet form similar to a wet felt, is then applied over the assembly of the bag and the annular bodies, the whole is introduced in the mould S and further inflation of the hoses 1 and 2 is performed, preferably by means of a fluid under pressure of some 10 kg./sq. cm., after which the pressure is released and the bag and the annular bodies are removed.

What we claim is:

1. An inflatable core for forming in a rigid mould a hollow body that includes a plurality of joined portions having circular cross-sections which are arranged with their axes angularly displaced from each other and at least one of which has an end part of increased internal diameter; said core comprising an inflatable body having a plurality of connected cylindrical portions corresponding to the portions of the hollow body to be formed and arranged with their axes similarly angularly displaced from each other and an apertured wall between the interiors of said cylindrical portions of the inflatable body, and at least one annular, yieldable element having an external configuration corresponding to the internal shape of the end part of increased internal diameter and removably fitting on the one of said cylindrical portions corresponding to the related portion of the hollow body to be formed, said annular, yieldable element having an internal diameter substantially greater than the normal uninflated outer diameter of the related cylindrical portion so that said yieldable element is held on the latter only following initial inflation of said body and is capable of being expanded by the latter in response to further inflation for transmitting molding pressure to the molding material therearound.

2. An inflatable core as in claim 1; wherein each of said cylindrical portions has an annular, yieldable element fitting thereon.

3. An inflatable core as in claim 1; wherein another of said cylindrical portions of the inflatable body has a flange on the end thereof.

4. An inflatable core as in claim 1; wherein said annular, yieldable element has a radially outwardly directed flange on an end thereof.

5. A process for molding bifurcated pipes with enlarged ends from a plastic material like asbestos-cement comprising the steps of initially inflating a collapsible branched core with a terminal portion thereof surrounded by a loose yieldable ring whereby upon initial inflation of said core said terminal portion is clamped in the ring, applying the plastic material preformed as a sheet on said core and said ring, placing the core covered with the plastic material in a mold, further inflating the core to expand the latter and said yieldable ring, thereby to force the plastic material against the mold and form a correspondingly molded bifurcated pipe, releasing the pressure completely from the core to collapse the latter; extracting the collapsed core and the ring from the molded bifurcated pipe obtained and the latter from the mold.

References Cited in the file of this patent

UNITED STATES PATENTS

| | | |
|---|---|---|
| 720,718 | Maddock | Feb. 17, 1903 |
| 2,456,513 | Johnson | Dec. 14, 1948 |
| 2,646,606 | Easterday | July 28, 1953 |
| 2,704,875 | Kingston | Mar. 29, 1955 |
| 2,723,426 | Pelley | Nov. 15, 1955 |

FOREIGN PATENTS

| | | |
|---|---|---|
| 121,945 | Great Britain | Dec. 12, 1918 |